United States Patent
Lee et al.

(10) Patent No.: US 9,551,584 B2
(45) Date of Patent: Jan. 24, 2017

(54) APPARATUS AND METHOD FOR SWITCHING NAVIGATION MODE BETWEEN VEHICLE NAVIGATION MODE AND PERSONAL NAVIGATION MODE IN NAVIGATION DEVICE

(71) Applicant: Samsung Electronics Co., Ltd., Gyeonggi-do (KR)

(72) Inventors: Jae-Myeon Lee, Gyeonggi-do (KR); Hyun-Su Hong, Gyeonggi-do (KR); Sung-Chul Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/077,468

(22) Filed: Mar. 22, 2016

(65) Prior Publication Data

US 2016/0202080 A1    Jul. 14, 2016

Related U.S. Application Data

(60) Continuation of application No. 13/945,532, filed on Jul. 18, 2013, now Pat. No. 9,316,500, which is a (Continued)

(30) Foreign Application Priority Data

May 19, 2005  (KR) .................. 10-2005-0042075

(51) Int. Cl.
*G01C 21/00* (2006.01)
*G01C 21/34* (2006.01)
(Continued)

(52) U.S. Cl.
CPC .......... *G01C 21/3423* (2013.01); *G01C 21/00* (2013.01); *G01C 21/20* (2013.01); *G01C 21/26* (2013.01);
(Continued)

(58) Field of Classification Search
CPC ......... G01C 21/00; G01C 21/20; G01C 21/26; G01C 21/3688
(Continued)

(56) References Cited

U.S. PATENT DOCUMENTS 5,862,511 A    1/1999  Croyle et al.
5,910,882 A    6/1999  Burrell
(Continued)

FOREIGN PATENT DOCUMENTS

EP    1 077 362         2/2001
JP    2002148052 A      5/2002
(Continued)

*Primary Examiner* — Jack W Keith
*Assistant Examiner* — Chuong P Nguyen
(74) *Attorney, Agent, or Firm* — The Farrell Law Firm, P.C.

(57) ABSTRACT

Provided is an apparatus and method for switching a navigation mode between a vehicle navigation mode and a personal navigation mode in a navigation device supporting vehicle navigation and personal navigation. Switching between the vehicle navigation mode and the personal navigation mode is performed according to whether the navigation device is mounted in a navigation device holder, whether a GPS speed provided by a GPS receiver is higher than a predetermined speed, and whether a step is detected using an output of an accelerometer. Since mode switching between the vehicle navigation mode and the personal navigation mode is automatically performed, a user does not need to manually perform mode switching.

14 Claims, 6 Drawing Sheets

Related U.S. Application Data division of application No. 11/404,600, filed on Apr. 14, 2006, now abandoned.

(51) Int. Cl.
- *G01S 19/42* (2010.01)
- *G01S 19/52* (2010.01)
- *G01C 21/20* (2006.01)
- *G01C 21/26* (2006.01)
- *G01C 21/36* (2006.01)
- *G01P 15/00* (2006.01)

(52) U.S. Cl.
CPC ................ *G01S 19/42* (2013.01); *G01S 19/52* (2013.01); *G01C 21/3688* (2013.01); *G01P 15/00* (2013.01)

(58) Field of Classification Search
USPC ....... 701/408, 433, 468; 340/995.16, 426.19, 340/426.2
See application file for complete search history.

(56) References Cited

U.S. PATENT DOCUMENTS

| | | | |
|---|---|---|---|
| 6,124,826 A | 9/2000 | Garthwaite et al. | |
| 6,339,746 B1 | 1/2002 | Sugiyama et al. | |
| 6,418,374 B2* | 7/2002 | Sakamoto | G01C 21/26 340/925 |
| 6,681,176 B2* | 1/2004 | Funk | G01C 21/3688 340/995.2 |
| 6,816,783 B2* | 11/2004 | Hashima | G01C 21/265 340/995.16 |
| 6,839,626 B2* | 1/2005 | Yamakita | G01C 21/20 342/357.57 |
| 2001/0021894 A1 | 9/2001 | Sakamoto et al. | |
| 2001/0027375 A1* | 10/2001 | Machida | G08G 1/096866 701/533 |
| 2002/0152027 A1 | 10/2002 | Allen | |
| 2003/0208314 A1 | 11/2003 | Funk et al. | |
| 2004/0059502 A1 | 3/2004 | Levi et al. | |
| 2004/0186632 A1 | 9/2004 | Arai | |
| 2004/0204840 A1 | 10/2004 | Hashima et al. | |
| 2004/0248543 A1 | 12/2004 | Itsukaichi | |
| 2010/0114477 A1* | 5/2010 | Yeh | G01C 21/26 701/533 |

FOREIGN PATENT DOCUMENTS

| | | |
|---|---|---|
| JP | 2004045436 | 2/2004 |
| KR | 100212252 | 5/1999 |

\* cited by examiner

APPARATUS AND METHOD FOR SWITCHING NAVIGATION MODE BETWEEN VEHICLE NAVIGATION MODE AND PERSONAL NAVIGATION MODE IN NAVIGATION DEVICE

PRIORITY

This application is a Continuation application of U.S. patent application Ser. No. 13/945,532 filed in the U.S. Patent and Trademark Office on Jul. 18, 2013, which is a Divisional application of U.S. patent application Ser. No. 11/404,600 filed in the U.S. Patent and Trademark Office on Apr. 14, 2006 and claims priority under 35 U.S.C. §119 to an application filed in the Korean Intellectual Property Office on May 19, 2005 and assigned Serial No. 10-2005-0042075, the contents of each of which are incorporated herein by reference.

BACKGROUND OF THE INVENTION

1. Field of the Invention

The present invention relates generally to a navigation system supporting vehicle navigation and personal navigation, and in particular, to an apparatus and method for switching a navigation mode between a vehicle navigation mode and a personal navigation mode in a navigation device supporting vehicle navigation and personal navigation.

2. Description of the Related Art

Vehicle navigation systems, for example a car navigation system, recognizes a current position of a user's car. It provides an optimal route to a user's desired destination to the user, and guides the user along the optimal route. Generally, car navigation calculates the current position of the car using a Global Positioning System (GPS) sensor and a Dead Reckoning (DR) sensor and guides a route from the current position to the destination.

Personal navigation devices guide a route for a walker, and is similar to car navigation. But unlike car navigation, it requires more accurate position measurement and more detailed route guiding because the speed of the walker is generally slower than that of the car.

Thus, car navigation and personal navigation perform route guiding using different navigation algorithms. For example, car navigation recognizes a current position of a car by directly integrating outputs of an accelerometer sensor, whereas personal navigation detects steps of a walker to recognize a current position of the walker. For this reason, car navigation and personal navigation use separate dedicated navigation devices for performing different algorithms or are implemented to operate different algorithms separately even when using one navigation device.

The use of separate navigation devices for car navigation and personal navigation increases cost and causes inconvenience. To solve the problem, a navigation device supporting both car navigation and personal navigation has been recently developed.

However, in conventional navigation devices supporting car navigation and personal navigation, a user is required to manually perform mode switching between car navigation and personal navigation. In other words, the user manually terminates car navigation and initiates personal navigation to use personal navigation during the use of car navigation, and vice versa.

As a result, conventional navigation devices cause inconvenience because the user has to separately input car navigation information and personal navigation information. Moreover, when the user mistakenly switches to car navigation for personal navigation or vice versa, it may result in wrong route guiding.

SUMMARY OF THE INVENTION

Therefore, it is an object of the present invention to provide an apparatus and method for switching a navigation mode between a vehicle navigation mode and a personal navigation mode in a navigation device supporting vehicle navigation and personal navigation, in which mode switching is automatically performed without a user's manipulation.

It is another object of the present invention to provide an apparatus and method for switching a navigation mode between a vehicle navigation mode and a personal navigation mode in a navigation device supporting vehicle navigation and personal navigation, in which the navigation device determines whether a user uses a vehicle, such as a car, or walks. Upon such determination the navigation device automatically performs the appropriate mode switching.

According to one aspect of the present invention, there is provided an apparatus for switching a navigation mode between a vehicle navigation mode and a personal navigation mode in a navigation device. The apparatus includes a personal navigation algorithm for implementing a personal navigation mode, a vehicle navigation algorithm for implementing a vehicle navigation mode, an external device interface for connecting the navigation device and an external device, a speed measuring unit for providing a speed of the navigation device, a step detecting unit for detecting a step according to movement of the navigation device, and a navigation algorithm controller for switching the navigation mode between the vehicle navigation mode and the personal navigation mode. The switching of the navigation mode is done according to whether the navigation device is mounted in a navigation device holder through the external device interface, whether the speed of the navigation device is greater than a predetermined speed threshold, and whether a step is detected by the step detecting unit.

According to another aspect of the present invention, there is provided a method for switching a navigation mode between a vehicle navigation mode and a personal navigation mode in a navigation device. The method includes executing a navigation program upon request from a user and determining whether the navigation device is mounted in a navigation device holder, switching the navigation mode to the vehicle navigation mode if the navigation device is mounted in the navigation device holder and acquiring a speed of the navigation device if the navigation device is not mounted in the navigation device holder, switching the navigation mode to the vehicle navigation mode if the speed of the navigation device is greater than a predetermined speed threshold and acquiring a measured acceleration of the navigation device if the speed of the navigation device is less than a predetermined speed threshold, and determining whether a step is detected according to the recognition result, switching the navigation mode to the vehicle navigation mode if a step is not detected, and switching the navigation mode into the personal navigation mode if a step is detected.

BRIEF DESCRIPTION OF THE DRAWINGS

The above and other objects, features, and advantages of certain exemplary embodiments of the present invention will be more apparent from the following description taken in conjunction with the accompanying drawings, in which.

DETAILED DESCRIPTION OF THE PREFERRED EMBODIMENT

The matters defined in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Similarly those of ordinary skills in the art will recognize that a preferred embodiment of the present invention is provided with reference to a vehicle navigation method and device, an example of which is a car navigation method and device. Also, descriptions of well-known functions and constructions are omitted for clarity and conciseness.

In the present invention, a navigation device performing navigation of a vehicle, such as a car, and personal navigation and automatically switching between vehicle navigation and personal navigation modes is provided. For simplicity of explanation, the vehicle navigation device and method of the present invention will hereinafter be referred to as a car navigation device and method.

Figure 1:
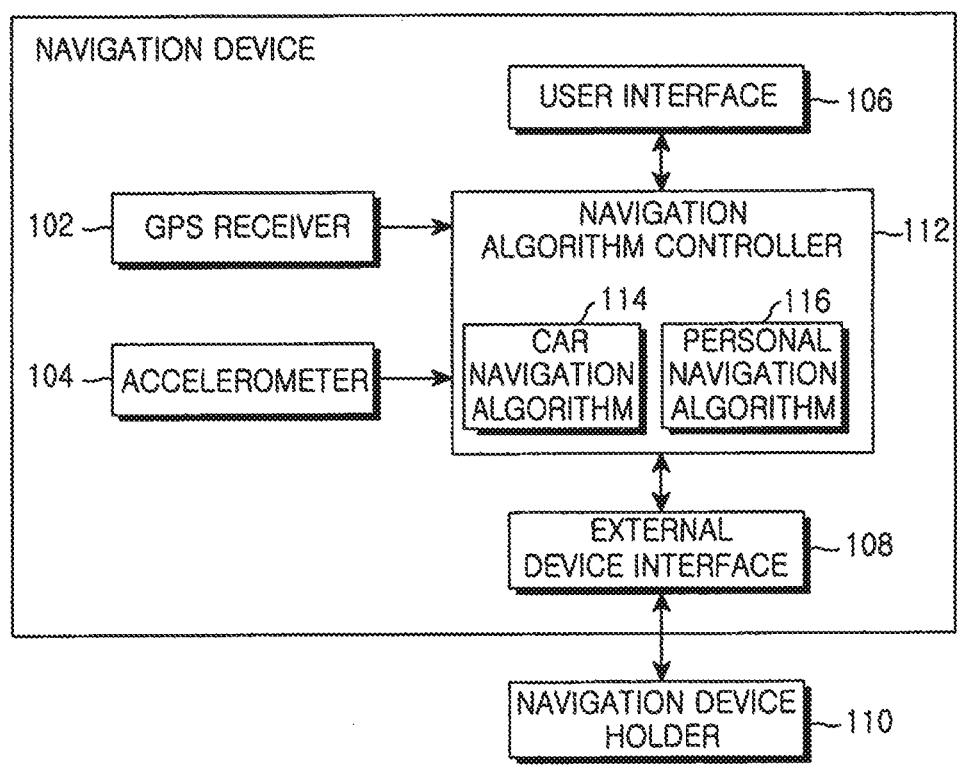
FIG. 1 is a block diagram of a navigation device according to the present invention.

FIG. 1 is a block diagram of a navigation device according to the present invention. Referring to FIG. 1, the navigation device includes a Global Positioning System (GPS) receiver 102, an accelerometer 104, a navigation algorithm controller 112, a user interface 106, and an external device interface 108.

The GPS receiver 102 receives a GPS signal from a GPS satellite and provides a GPS speed of the navigation device using position information and time information included in the GPS signal.

The accelerometer 104 may be a three-axis accelerometer and measures as well as outputs a speed according to movement of the navigation device.

The user interface 106 may be an input device such as a keypad or a touch panel and interfaces with a user. For example, the user interface 106 receives a navigation program execution request from the user and transmits the same to the navigation algorithm controller 112.

The external device interface 108 is a connector between the navigation device and an external device and performs interfacing between the navigation device and an external device in a serial communication manner such as Universal Asynchronous Receiver Transmitter (UART) or Universal Serial Bus (USB). For example, the external device interface 108 connects and interfaces the navigation device with a navigation device holder 110 or a navigation device charger (e.g., a cigar jack).

The navigation algorithm controller 112 which includes a car navigation algorithm 114 and a personal navigation algorithm 116, executes a corresponding navigation program in response to a navigation program execution request, and determines whether a current mode is a car mode or a personal mode according to a predetermined criterion.

For example, the navigation algorithm controller 112 determines whether the current mode is the car mode or the personal mode according to whether the navigation device is mounted in the navigation device holder 110, the GPS speed provided by the GPS receiver 102 is higher than a predetermined speed, and a step is detected based on a measured acceleration. If the current mode is determined to be the car mode, the navigation algorithm controller 112 switches a navigation mode to a car navigation mode that implements the car navigation algorithm 114. If the current mode is determined to be the personal mode, the navigation algorithm controller 112 switches a navigation mode to a personal navigation mode that implements the personal navigation algorithm 116.

In switching between the car navigation mode and the personal navigation mode, the car navigation algorithm 114 and the personal navigation algorithm 116 provide position information, speed information, and azimuth information to an algorithm corresponding to the switched mode. In other words, in switching between the car navigation mode and the personal navigation mode, the car navigation algorithm 114 and the personal navigation algorithm 116 provide acceleration data logs measured by the accelerometer 104 for 1-10 seconds and position, speed, and azimuth data logs measured by a GPS for 1-10 seconds to an algorithm corresponding to the switched mode. A data rate time unit is used in the car navigation algorithm 114 and the personal navigation algorithm 116. A data log measured for 1 second is provided when a data rate is higher than 50 Hz and a data log measured for 10 seconds is provided when a data rate is lower than 10 Hz.

Previous sensor data is required for calculation of a reference value or a median value of a sensor in the car navigation mode and is required for step detection and pace estimation in the personal navigation mode. Thus, previous sensor data is exchanged in switching between the car navigation mode and the personal navigation mode.

The data rate means the data rate of a sensor and is a period of the output of an accelerometer and a terrestrial magnetic sensor. The car navigation algorithm 114 and the personal navigation algorithm 116 require sensor values whose number is greater than a predetermined number, i.e., successive sensor values whose number is greater than a predetermined number. Thus, data measured for a long time (e.g., 10 seconds) is secured in case of low data rate and data measured for a short time (e.g., 1 second) is secured in case of high data rate to fit in the required total number of data values.

For example, the car navigation algorithm 114 terminates car navigation upon request for switching to the personal navigation mode while performing car navigation and provides position, speed, and azimuth data of the navigation device to the personal navigation algorithm 116. The personal navigation algorithm 116 subsequently then performs personal navigation from car navigation, using the data provided from the car navigation algorithm 114.

The personal navigation algorithm 116 terminates personal navigation upon request for switching to the car navigation mode while performing personal navigation and provides position, speed, and azimuth data of the navigation device to the car navigation algorithm 114. The car navigation algorithm 114 subsequently then performs car navigation from personal navigation, using the data provided from the personal navigation algorithm 116.

Hereinafter is a description of a method for switching a navigation mode between the car navigation mode and the personal navigation mode in a navigation device according to the present invention.

According to a first embodiment of the present invention, the navigation device performs mode switching between the car navigation mode and the personal navigation mode according to whether the navigation device is mounted in the navigation device holder 110.

Figure 2:
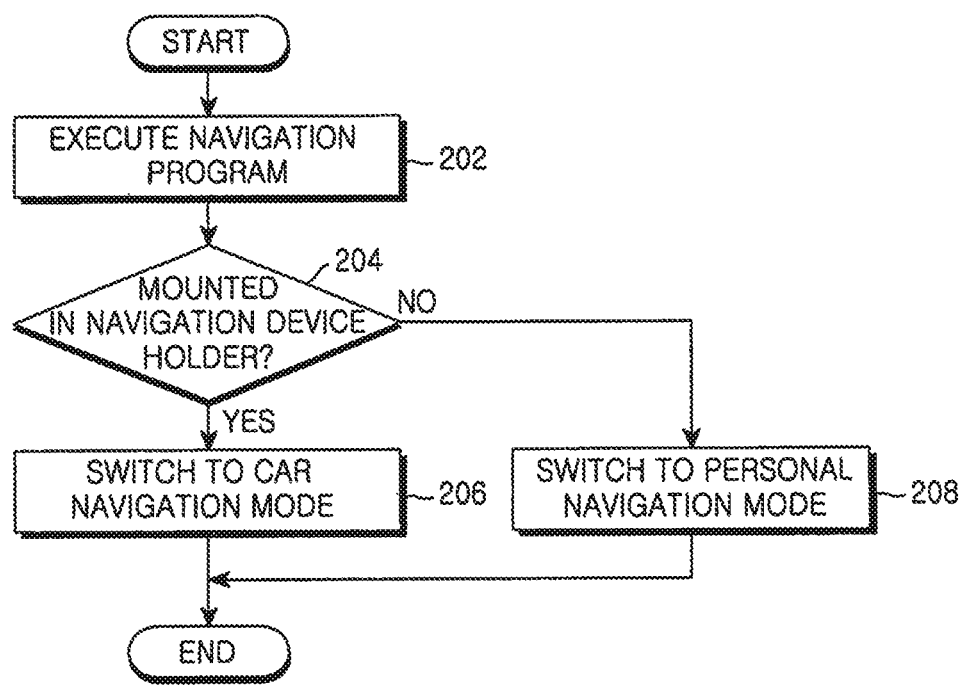
FIG. 2 is a flowchart illustrating mode switching between a vehicle navigation mode and a personal navigation mode according to a first embodiment of the present invention.

FIG. 2 is a flowchart illustrating mode switching between the car navigation mode and the personal navigation mode according to the first embodiment of the present invention. Referring to FIG. 2, the navigation device executes a navigation program in response to a navigation program execution request from a user in step 202. Upon execution of the navigation program, the navigation device determines whether it is mounted in the navigation device holder 110 in step 204. The navigation device can make a determination using a mechanical method and a message transmission method.

According to the mechanical method, the navigation device determines whether it is mounted in the navigation device holder 110 by checking if a button in a portion of the navigation device that physically contacts the navigation device holder 110 is depressed. The navigation device determines that it is mounted in the navigation device holder 110 if the button is depressed. If the button is not depressed, the navigation device determines that it is separated from the navigation device holder 110.

According to the message transmission method, the navigation device transmits a holder ID request message to the navigation device holder 110 through the external device interface 108 and determines whether it is mounted in the navigation device holder 110 by checking if a holder ID or an interrupt message is received as a response to the request message. If the holder ID or the interrupt message is received, the navigation device determines that it is mounted in the navigation device holder 110. If the holder ID or the interrupt message is not received, the navigation device determines that it is separated from the navigation device holder 110. However, the navigation device may fail to receive the holder ID or the interrupt message from the navigation device holder 110. Thus, every 10 seconds the navigation device repetitively transmits the holder ID request message to the navigation device holder 110. Upon receipt of the holder ID or the interrupt message, the navigation device determines that it is mounted in the navigation device holder 110. When the navigation device is determined to be mounted in the navigation device holder 110, it continuously transmits the holder ID request message every 30 seconds to the navigation device holder 110 to determine whether it is separated from the navigation device holder 110.

If the navigation device is determined to be mounted in the navigation device holder 110, it switches a navigation mode to the car navigation mode in step 206 and then performs car navigation using the car navigation algorithm 114.

If the navigation device is determined to be separated from the navigation device holder 110, it switches a navigation mode to the personal navigation mode in step 208 and then performs personal navigation using the personal navigation algorithm 116.

According to a second embodiment of the present invention, the navigation device performs mode switching between the car navigation mode and the personal navigation mode according to whether a GPS speed provided by the GPS receiver 102 is higher than a predetermined speed.

Figure 3:
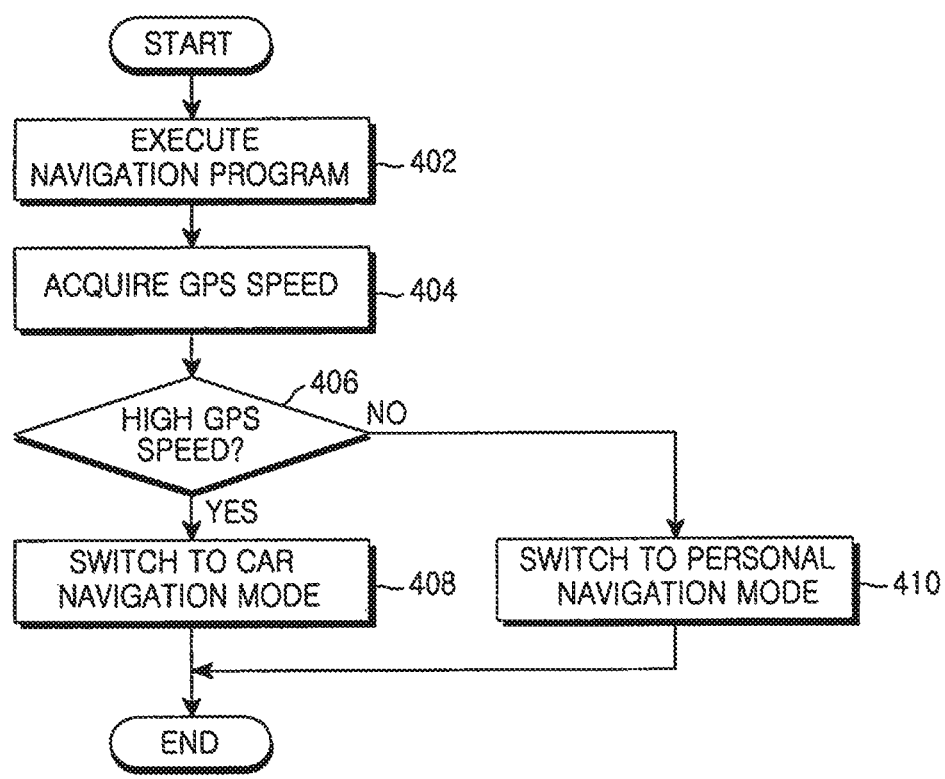
FIG. 3 is a flowchart illustrating mode switching between a vehicle navigation mode and a personal navigation mode according to a second embodiment of the present invention.

FIG. 3 is a flowchart illustrating mode switching between the car navigation mode and the personal navigation mode according to the second embodiment of the present invention. Referring to FIG. 3, the navigation device executes a navigation program in response to a navigation program execution request from the user in step 402. Upon execution of the navigation program, the navigation device acquires GPS speed information from the GPS receiver 102 in step 404.

The navigation device then determines whether the acquired GPS speed is high in step 406. In other words, the navigation device determines whether the acquired GPS speed is higher than a predetermined speed threshold. The GPS speed has a limit in the personal navigation mode, since a user will either walk or run while carrying the navigation device. Thus, the navigation device assumes that the maximum speed of a walker is about 25 km/h and sets 25 km/h as a speed threshold. The navigation device determines that the GPS speed is high when the GPS speed is higher than the speed threshold. If the GPS speed is lower than the speed threshold, the navigation device determines that the GPS speed is low.

When the GPS speed is high, the navigation device determines that the current mode is the car mode and switches a navigation mode to the car navigation mode in step 408. The navigation device then performs car navigation using the car navigation algorithm 114. If the GPS speed is not high, the navigation device determines that the current mode is the personal mode and switches a navigation mode to the personal navigation mode in step 410. The navigation device then performs personal navigation using the personal navigation algorithm 116.

According to a third embodiment of the present invention, the navigation device performs mode switching between the car navigation mode and the personal navigation mode according to whether a step is detected using an output of the accelerometer 104.

Figure 4:
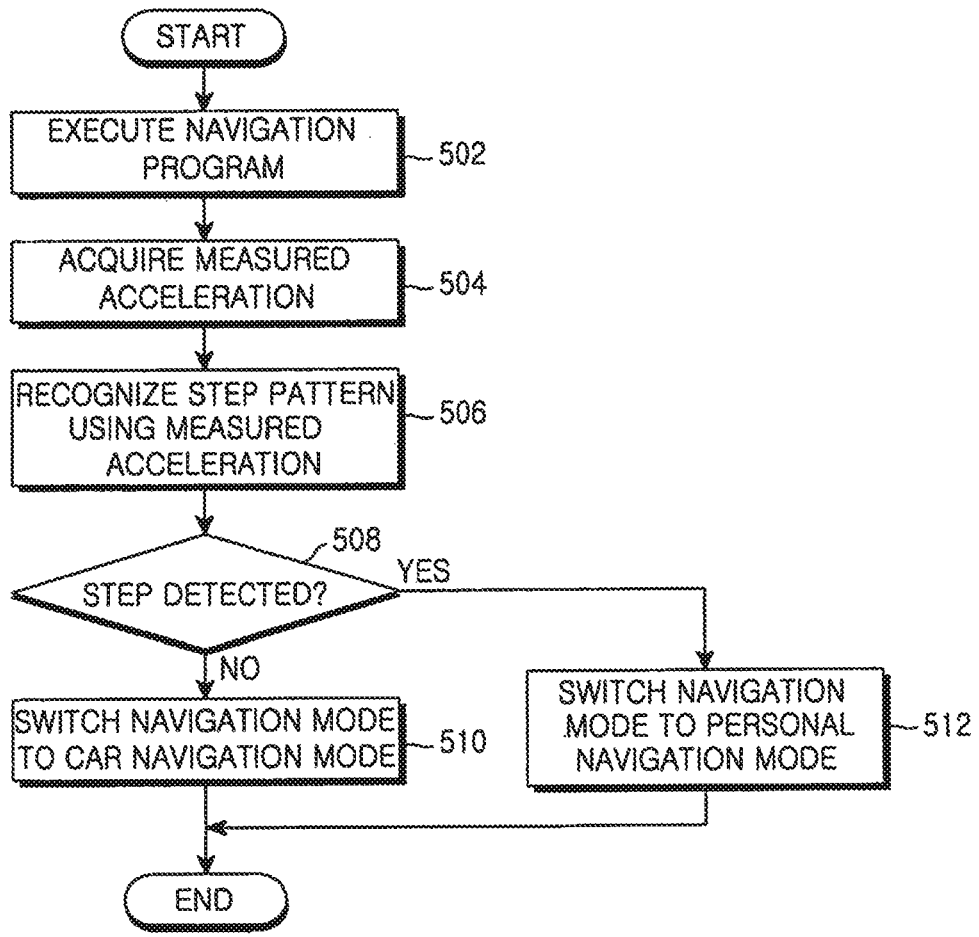
FIG. 4 is a flowchart illustrating mode switching between a vehicle navigation mode and a personal navigation mode according to a third embodiment of the present invention.

FIG. 4 is a flowchart illustrating mode switching between the car navigation mode and the personal navigation mode according to the third embodiment of the present invention. Referring to FIG. 4, the navigation device executes a navigation program in response to a navigation program execution request from the user in step 502. The navigation device acquires an acceleration measured by the accelerometer 104 in step 504.

The navigation device recognizes a step pattern using the measured acceleration in step 506. When a user walks, an acceleration measured by the accelerometer 104 is output as a frequency waveform of a predetermined pattern in which an acceleration component toward the center of the earth, i.e., an acceleration magnitude toward the center of the earth is greater than ±0.5 g (g=9.8 m/s, earth gravitational acceleration). However, when the user uses a car, a specific waveform greater than 0.5 g of an acceleration measured by the accelerometer 104 is not output as a frequency waveform of the predetermined pattern. Thus, the navigation device checks if an acceleration measured by the accelerometer 104 is output as a frequency waveform of the predetermined pattern to recognize a step pattern. A step detection algorithm for recognizing the step pattern may be various well-known step detection methods including a zero-crossing method.

The navigation device determines whether a step is detected in step 508. If a step is not detected, the navigation device determines that the user is not walking and switches a navigation mode to the car navigation mode in step 510. The navigation device implements the car navigation mode using the car navigation algorithm 114. If a step is detected, the navigation device determines that the user is walking and switches a navigation mode to the personal navigation mode in step 512. The navigation device implements the personal navigation mode using the personal navigation algorithm 116.

According to a fourth embodiment of the present invention, the navigation device performs mode switching between the car navigation mode and the personal navigation mode according to whether the navigation device is mounted in the navigation device holder 110, whether a GPS speed provided by the GPS receiver 102 is higher than a predetermined speed, and whether a step is detected using an output of the accelerometer 104. According to a fifth embodiment of the present invention, since a navigation mode is likely to be the car navigation mode when the user is on a driveway or an express highway, a reference value for a GPS speed and a reference value for an acceleration measured by the accelerometer 104 for car/personal mode determination are set useful for determination of the car navigation mode. Mode switching between the car navigation mode and the personal navigation mode is performed according to the reference values.

Figure 5:
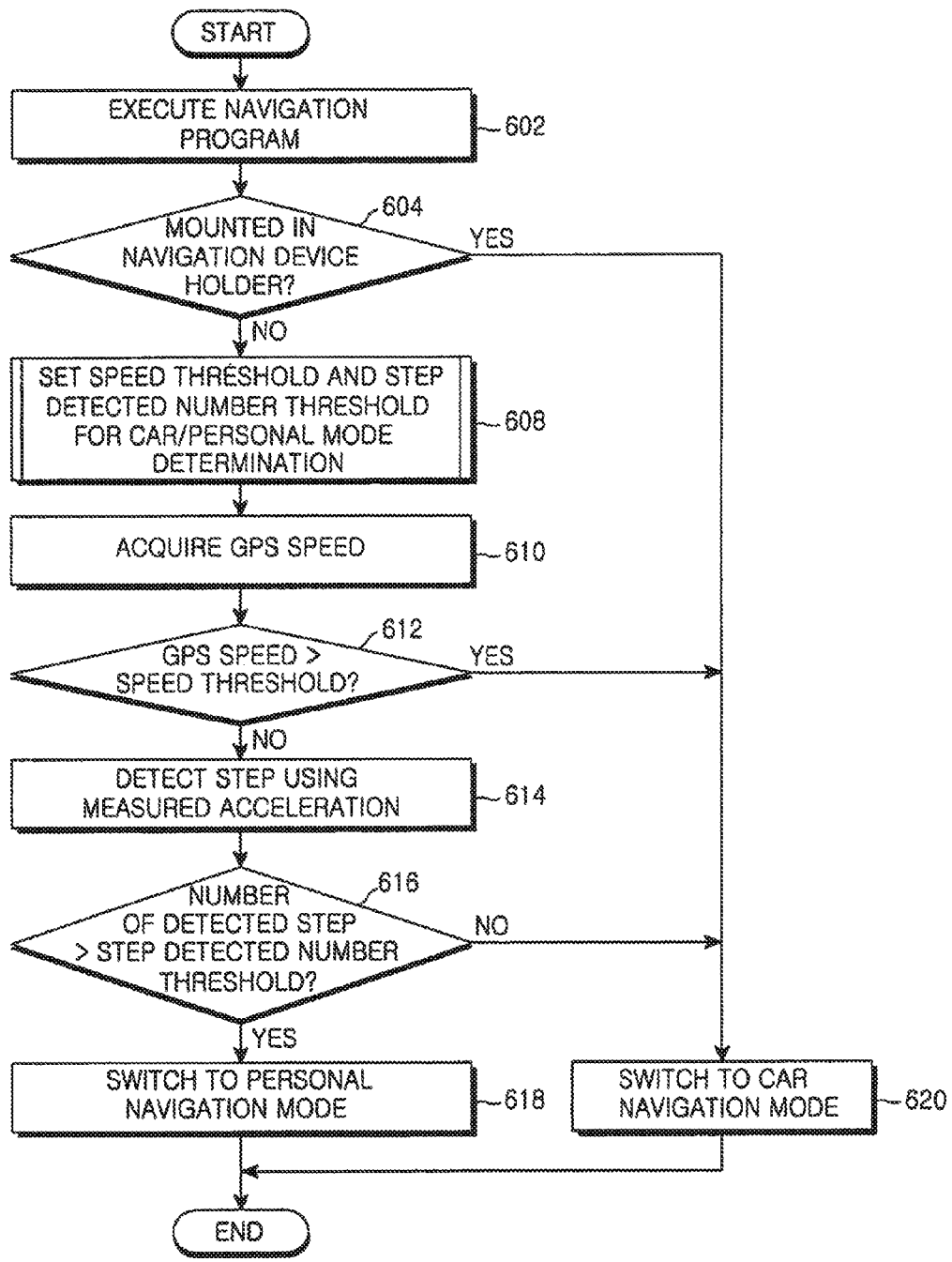
FIG. 5 is a flowchart illustrating mode switching between a vehicle navigation mode and a personal navigation mode according to a fourth embodiment of the present invention.

FIG. 5 is a flowchart illustrating mode switching between the car navigation mode and the personal navigation mode according to the fourth embodiment of the present invention. Referring to FIG. 5, the navigation device executes a navigation program in response to a navigation program execution request from the user in step 602.

The navigation device determines whether it is mounted in the navigation device holder 110 in step 604 as described about step 204 with reference to FIG. 2.

If the navigation device is mounted in the navigation device holder 110, it determines that the current mode is the car mode and switches the navigation mode to the car navigation mode in step 620. The navigation device then performs car navigation using the car navigation algorithm 114.

If the navigation device is not mounted in the navigation device holder 110, it sets a speed threshold α and a step detected number threshold β for car/personal mode determination in step 608.

Figure 6:
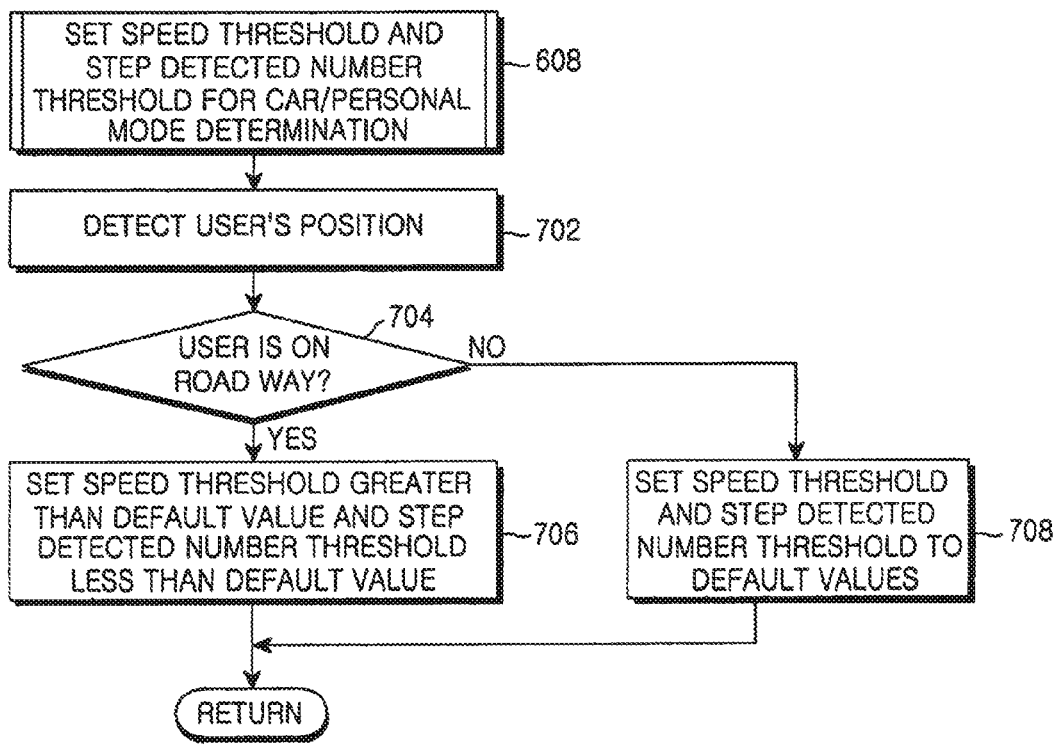
FIG. 6 is a flowchart illustrating a process of setting a speed threshold and a step detected number threshold for a vehicle/personal mode determination according to the present invention.

FIG. 6 is a flowchart illustrating a process of setting the speed threshold α and the step number detection threshold β for car/personal mode determination according to the present invention. Referring to FIG. 6, the navigation device detects a user's position in step 702. The navigation device can detect the user's position using a GPS signal received by the GPS receiver 102. The navigation device determines whether the user's position is a road way in step 704. In other words, the navigation device determines whether the user is on a driveway or an express highway. This is because the user is likely to use car navigation when on a road way and is likely to use personal navigation when not on a road way.

If the user is on a road way, the navigation device sets the GPS speed threshold α greater than a default value and the step detected number threshold β less than a default value. In other words, when the user is on a road way, the navigation device sets the GPS speed threshold α and the step detected number threshold β to values useful for determination of the car navigation mode.

When the user is not on a road way, the navigation device sets the GPS speed threshold α and the step detected number threshold β to default values in step 708 or may set the GPS speed threshold α less than a default value and the step detected number threshold β greater than a default value usefully for determination of the personal navigation mode.

After setting the GPS speed threshold α and the step detected number threshold β, the navigation device acquires GPS speed information from the GPS receiver 102 in step 610.

The navigation device determines whether the acquired GPS speed is greater than the set GPS speed threshold α in step 612. If the acquired GPS speed is greater than the set GPS speed threshold α, it means that the GPS speed is high. Thus, the navigation device determines that the current mode is the car mode and switches a navigation mode to the car navigation mode in step 620. The navigation device then performs car navigation using the car navigation algorithm 114.

If the acquired GPS speed is less than the set GPS speed threshold α, it means that the GPS speed is low. Thus, the navigation device determines that the current mode is not the car mode and performs step detection for car/personal mode determination in step 614. In other words, the navigation device recognizes a step pattern using an acceleration measured by the accelerometer 104 and performs step detection according to the recognition result.

The navigation device determines whether the number of detected steps is greater than the set step detected number threshold β in step 616. If the number of detected steps is less than the set step detected number threshold β, the navigation device determines that the user is not walking and switches the navigation mode to the car navigation mode in step 620. The navigation device then performs car navigation using the car navigation algorithm 114.

If the number of detected steps is greater than the set step detected number threshold β, the navigation device determines that the user is walking and switches the navigation mode to the personal navigation mode in step 618. The navigation device then performs personal navigation using the personal navigation algorithm 116.

As described above, according to the present invention, switching between a car navigation mode and a personal navigation mode is automatically performed in a single navigation device, thereby alleviating inconvenience of requiring the user's manual mode switching.

Moreover, in switching between the car navigation mode and the personal navigation mode, an algorithm provides position, velocity, and azimuth data of the navigation device to another algorithm corresponding to a switched mode. Thus, personal navigation is subsequently automatically performed from car navigation or car navigation is subsequently automatically performed from personal navigation.

Furthermore, once a navigation program is executed, the navigation device automatically switches between the car navigation mode and the personal navigation mode. Thus, the user does not need to perform manual mode switching on a way from a departure to a destination.

While the present invention has been shown and described with reference to preferred embodiments thereof, it will be understood by those skilled in the art that various changes in form and details may be made therein without departing from the spirit and scope of the invention.

What is claimed is:

1. An apparatus for switching a navigation mode between a vehicle navigation mode and a pedestrian navigation mode, the apparatus comprising:
   an accelerometer configured to detect an acceleration of the apparatus;
   a Global Positioning System (GPS) receiver configured to receive a GPS signal; and
   a controller configured to:
   switch the navigation mode of the apparatus from the vehicle navigation mode to the pedestrian navigation mode, if a step of a user is recognized based on the acceleration of the apparatus detected by the accelerometer, and
   switch the navigation mode of the apparatus from the pedestrian navigation mode to the vehicle navigation mode, based on a velocity of the apparatus calculated using the GPS signal received by the GPS receiver.

2. The apparatus of claim 1, wherein the controller is further configured to switch the navigation mode of the apparatus from the pedestrian navigation mode to the vehicle navigation mode, if the velocity of the apparatus calculated using the GPS signal received by the GPS receiver is greater than a first threshold value.

3. The apparatus of claim 2, wherein the controller is further configured to identify a location of the apparatus by using the GPS signal received by the GPS receiver.

4. The apparatus of claim 3, wherein the first threshold value is determined based on the identified location of the apparatus.

5. The apparatus of claim 1, wherein the controller is further configured to determine whether the detected acceleration of the apparatus is output as a frequency waveform of a step pattern.

6. The apparatus of claim 5, wherein the controller recognizes the step of the user, if the detected acceleration of the apparatus is output as the frequency waveform of the step pattern.

7. The apparatus of claim 1, wherein the controller is further configured to determine whether a number of recognized steps of the user is greater than a second threshold value, if the step of the user is recognized.

8. The apparatus of claim 7, wherein the controller is further configured to switch the navigation mode of the apparatus from the vehicle navigation mode to the pedestrian navigation mode, if the number of recognized steps of the user is greater than the second threshold value.

9. A method for switching a navigation mode between a vehicle navigation mode and a pedestrian navigation mode in an apparatus including an accelerometer and a Global Positioning System (GPS) receiver, the method comprising the steps of:
   detecting, by the accelerometer, an acceleration of the apparatus;
   receiving, by the GPS receiver, a GPS signal;
   switching, by the apparatus, the navigation mode of the apparatus from the vehicle navigation mode to the pedestrian navigation mode, if a step of a user is recognized based on the acceleration of the apparatus detected by the accelerometer; and
   switching, by the apparatus, the navigation mode of the apparatus from the pedestrian navigation mode to the vehicle navigation mode, based on a velocity of the apparatus calculated using the GPS signal received by the GPS receiver.

10. The method of claim 9, wherein switching the navigation mode of the apparatus from the pedestrian navigation mode to the vehicle navigation mode comprises:
    switching the navigation mode of the apparatus from the pedestrian navigation mode to the vehicle navigation mode, if the velocity of the apparatus calculated using the GPS signal received by the GPS receiver is greater than a first threshold value.

11. The method of claim 10, further comprising:
    identifying a location of the apparatus by using the GPS signal received by the GPS receiver.

12. The method of claim 11, wherein the first threshold value is determined based on the identified location of the apparatus.

13. The method of claim 9, further comprising:
    determining whether the detected acceleration of the apparatus is output as a frequency waveform of a step pattern; and
    recognizing the step of the user, if the detected acceleration of the apparatus is output as the frequency waveform of the step pattern.

14. The method of claim 9, further comprising:
    determining whether a number of recognized steps of the user is greater than a second threshold value; and
    recognizing the step of the user, if the number of recognized steps of the user is greater than the second threshold value.

* * * * *